US012119959B2

(12) United States Patent
Nath et al.

(10) Patent No.: US 12,119,959 B2
(45) Date of Patent: Oct. 15, 2024

(54) MANAGING TRAFFIC FOR ENDPOINTS IN DATA CENTER ENVIRONMENTS TO PROVIDE CLOUD MANAGEMENT CONNECTIVITY

(71) Applicant: Cisco Technology, Inc., San Jose, CA (US)

(72) Inventors: Smita Nath, San Jose, CA (US); Siva Vaddepuri, San Jose, CA (US); Abhijit Vijay Warkhedi, Milpitas, CA (US); Shyam Kapadia, San Jose, CA (US); Sundeep Kumar Singh, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 17/550,715

(22) Filed: Dec. 14, 2021

(65) Prior Publication Data

US 2023/0188382 A1    Jun. 15, 2023

(51) Int. Cl.
*H04L 12/46* (2006.01)
*G06F 15/173* (2006.01)
(Continued)

(52) U.S. Cl.
CPC .... *H04L 12/4633* (2013.01); *G06F 15/17312* (2013.01); *H04L 12/4641* (2013.01);
(Continued)

(58) Field of Classification Search
CPC . H04L 12/4633; H04L 12/44; H04L 41/0806; H04L 67/567; H04L 45/741;
(Continued)

(56) References Cited

U.S. PATENT DOCUMENTS 11,310,080 B2 *  4/2022  Duan ................. G06F 9/45558
2016/0191380 A1  6/2016  De et al.
(Continued)

FOREIGN PATENT DOCUMENTS

EP         3716063 A1     9/2020

OTHER PUBLICATIONS

Dell Technologies Solutions White Paper, "Introducing VMWare NSX-T Into Dell EMC VxBlock 1000", Apr. 2020,19 pages. (Year: 2020).*
(Continued)

*Primary Examiner* — Gregory Todd
(74) *Attorney, Agent, or Firm* — Lee & Hayes, P.C.

(57) ABSTRACT

Techniques for combining the functionality of fabric interconnects and switches (e.g., Top-of-Rack (ToR) switches) into one network entity, thereby reducing the number of devices in a fabric and complexity of communications in the fabric. By collapsing FI and ToR switch functionality into one network entity, server traffic may be directly forwarded by the ToR switch and an entire tier is now eliminated from the topology hierarchy which may improve the control, data, and management plane. Further, this disclosure describes techniques for dynamically managing the number of gateway proxies running on one or more computer clusters based on a number of managed switch domains.

20 Claims, 8 Drawing Sheets

(51) Int. Cl.
*H04L 41/04* (2022.01)
*H04L 41/046* (2022.01)
*H04L 45/00* (2022.01)
*H04L 45/741* (2022.01)
*H04L 61/103* (2022.01)
*H04L 61/5038* (2022.01)
H04L 12/44 (2006.01)
H04L 41/0806 (2022.01)
H04L 41/34 (2022.01)
H04L 67/567 (2022.01)

(52) U.S. Cl.
CPC ............ *H04L 41/04* (2013.01); *H04L 41/046* (2013.01); *H04L 45/26* (2013.01); *H04L 45/66* (2013.01); *H04L 45/72* (2013.01); *H04L 45/741* (2013.01); *H04L 61/103* (2013.01); *H04L 61/5038* (2022.05); *G06F 15/17343* (2013.01); *H04L 12/44* (2013.01); *H04L 41/048* (2013.01); *H04L 41/0806* (2013.01); *H04L 41/34* (2022.05); *H04L 67/567* (2022.05)

(58) Field of Classification Search
CPC ... H04L 12/4641; H04L 41/04; H04L 41/046; H04L 45/26; H04L 45/66; H04L 45/72; H04L 61/5038; H04L 61/103; G06F 15/17312
See application file for complete search history.

(56) References Cited

U.S. PATENT DOCUMENTS

| | | | |
|---|---|---|---|
| 2020/0169530 A1* | 5/2020 | Saha | H04L 61/5007 |
| 2020/0169531 A1* | 5/2020 | Saha | H04L 45/586 |
| 2020/0213227 A1 | 7/2020 | Pianigiani et al. | |
| 2020/0396179 A1 | 12/2020 | Lochhead et al. | |
| 2021/0112000 A1 | 4/2021 | Forster et al. | |
| 2021/0314291 A1* | 10/2021 | Chandrashekhar | H04L 45/54 |

OTHER PUBLICATIONS

Dell Technologies Solutions White Paper published Apr. 2020 title Introducing VMWare NSX-T Into Dell EMC VXBlock 1000 19 pages.
The PCT Search Report and Written Opinion mailed Mar. 22, 2023 for PCT application No. PCT/US2022/052813, 14 pages.

* cited by examiner

600 ⮕

```
┌─────────────────────────────────────────────────────────────────────┐
│ GENERATE, AT AN ENDPOINT DEVICE IN A DATA CENTER FABRIC, A FIRST    │
│              INTERNET PROTOCOL VERSION 6 (IPv6) LINK-LOCAL          │
│                          ADDRESS (LLA)                              │
│                              602                                    │
└─────────────────────────────────────────────────────────────────────┘
                                  │
                                  ▼
┌─────────────────────────────────────────────────────────────────────┐
│ SEND, FROM THE ENDPOINT DEVICE, A PACKET FROM OVER A VIRTUAL LOCAL  │
│ AREA NETWORK (VLAN) TO A SWITCH TO WHICH THE ENDPOINT DEVICE IS     │
│ ATTACHED, THE PACKET BEING A LAYER-2 (L2) PACKET AND HAVING A       │
│ SECOND IPv6 LLA ASSOCIATED WITH A GATEWAY PROXY AS A DESTINATION    │
│ ADDRESS, THE GATEWAY PROXY PROVIDING CONNECTIVITY TO A CLOUD        │
│ MANAGEMENT PLATFORM                                                 │
│                              604                                    │
└─────────────────────────────────────────────────────────────────────┘
                                  │
                                  ▼
┌─────────────────────────────────────────────────────────────────────┐
│ ENCAPSULATE, AT THE SWITCH, THE PACKET USING AN ENCAPSULATION       │
│ PROTOCOL SUCH THAT THE PACKET IS A L3 PACKET, THE PACKET HAVING A   │
│ VIRTUAL TUNNEL ENDPOINT (VTEP) ADDRESS ASSOCIATED WITH THE GATEWAY  │
│             PROXY AS AN OUTER DESTINATION ADDRESS                   │
│                              606                                    │
└─────────────────────────────────────────────────────────────────────┘
                                  │
                                  ▼
┌─────────────────────────────────────────────────────────────────────┐
│ SEND, FROM THE SWITCH, THE PACKET VIA A VIRTUAL TUNNEL TO THE VTEP  │
│              ADDRESS ASSOCIATED WITH THE GATEWAY PROXY              │
│                              608                                    │
└─────────────────────────────────────────────────────────────────────┘
                                  │
                                  ▼
┌─────────────────────────────────────────────────────────────────────┐
│ SEND, FROM THE GATEWAY PROXY, THE PACKET TO THE CLOUD MANAGEMENT    │
│ PLATFORM OVER A NETWORK THAT IS EXTERNAL THE DATA CENTER FABRIC     │
│                              610                                    │
└─────────────────────────────────────────────────────────────────────┘
```

FIG. 6

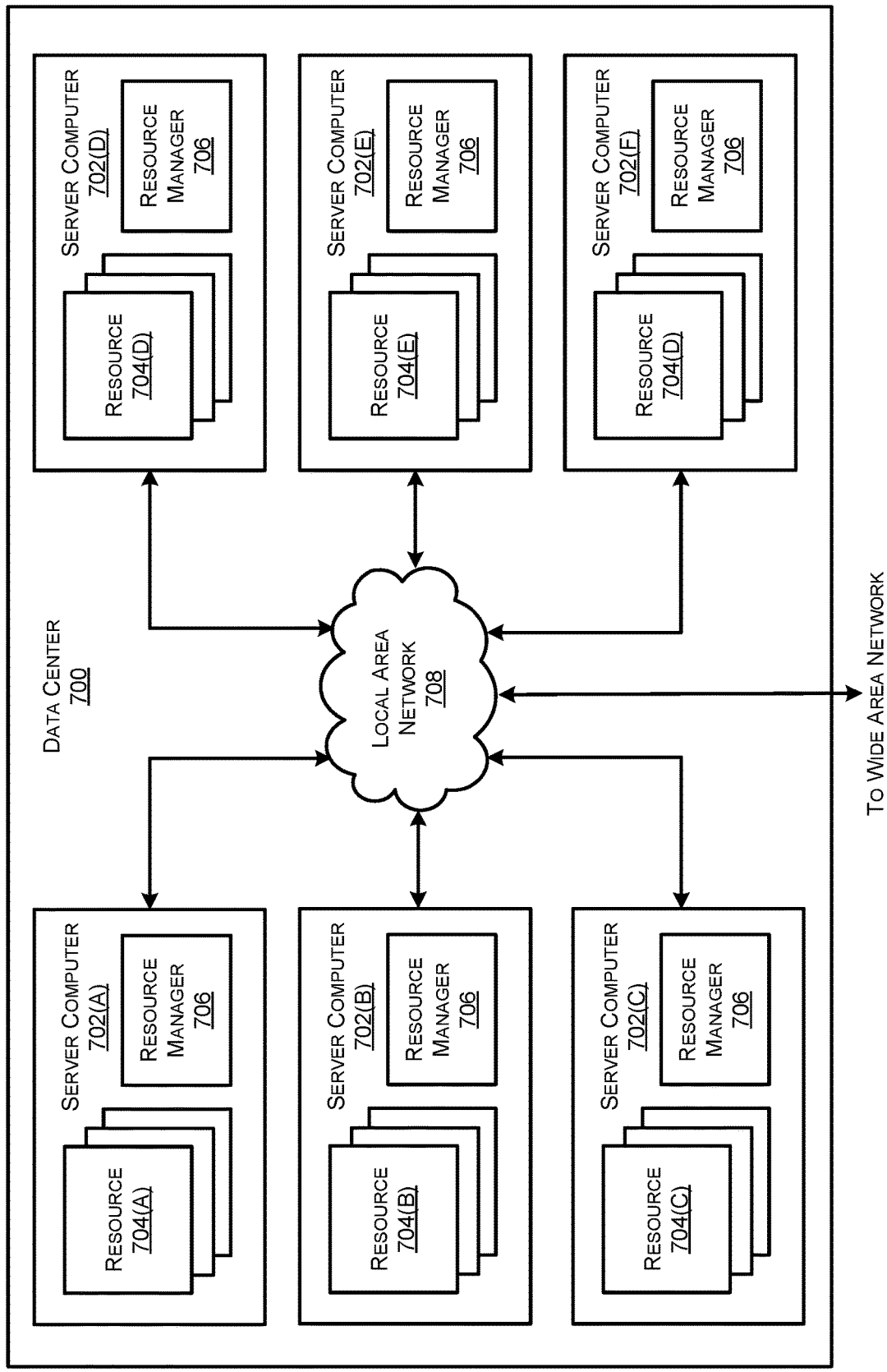

MANAGING TRAFFIC FOR ENDPOINTS IN DATA CENTER ENVIRONMENTS TO PROVIDE CLOUD MANAGEMENT CONNECTIVITY

TECHNICAL FIELD

The present disclosure relates generally to providing connectivity between network devices in a data center fabric and a cloud management platform that performs techniques for managing the network devices.

BACKGROUND

Cloud management platforms are used to provide visualization, optimization, and orchestration for applications and infrastructure across on-premise environments, cloud environments, and/or hybrid environments. The cloud management platforms may be Software-as-a-Service (SaaS) platforms that automate many tasks on behalf of users, and optimize traditional and cloud-native applications and infrastructure. For instance, cloud management platforms can provide lifecycle management of distributed infrastructure and workloads across data centers, remote sites, branch offices, and edge environments, which allows users to analyze, update, fix, and automate an application environment.

Cloud management platforms can be used to provide centralized management capabilities to unified computing system (UCS) domains across one or more data centers. Data centers typically comprise of multiple halls or rooms that each contain a large number of rows of server racks. In some data centers, each rack may comprise a set of servers and/or a set of server blades. The blade servers in a blade-chassis are in turn attached to a Fabric Interconnect (FI) (e.g., switch) that runs the management software that can manage the server blades and all rack servers. The FI, or pair of redundant FIs, are connected to a pair of Top-of-Row (ToR) switches that in turn are interconnected via a set of spine/aggregation-layer switches thereby providing any-to-any connectivity.

In order to communicate with devices in these domains, each device may run a software agent (referred to herein as "agent") that is used to help provision, configure, and manage network devices in the data centers (e.g., servers, Input/Output (IO) modules, appliance, virtual machines (VMs), switches, routers, etc.). In order to provision network devices in the domains, the agents running on the network devices generally initiate web-socket connections to the cloud management platform either directly or through a proxy. Because the connections to the cloud management platform are initiated from within the data center, secure web socket connections (e.g., Transport Layer Security (TLS) connections) can be established to the cloud management platform without having to interfere with any firewalls.

In a typical data center, for example there may be a plurality of servers per rack (e.g., 40-50 servers per rack), attached to a pair of Top-of-Rack (ToR) or access-layer switches that in turn are interconnected via a series of spine/aggregation-layer switches. The servers could be rack mounts or blades. Typically, a blade chassis containing server blades connect to a blade switch (e.g., UCS Fabric Interconnect (FI)) that in turn is interconnected to the ToR switches. Traditionally, a manager running on top of the UCS-FI is responsible for management of the devices in that server domain. While the FIs have traditionally been used by the cloud management platform to manage the servers, server blades, and/or other devices attached to the FIs, the addition of FIs in a data center fabric increases the number of devices in the fabric as well as the complexity for managing traffic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example method for providing an endpoint device with connectivity to a cloud management platform.

FIG. 7 illustrates a computing system diagram illustrating a configuration for a data center that can be utilized to implement aspects of the technologies disclosed herein.

DESCRIPTION OF EXAMPLE EMBODIMENTS

Overview

Figure 1:
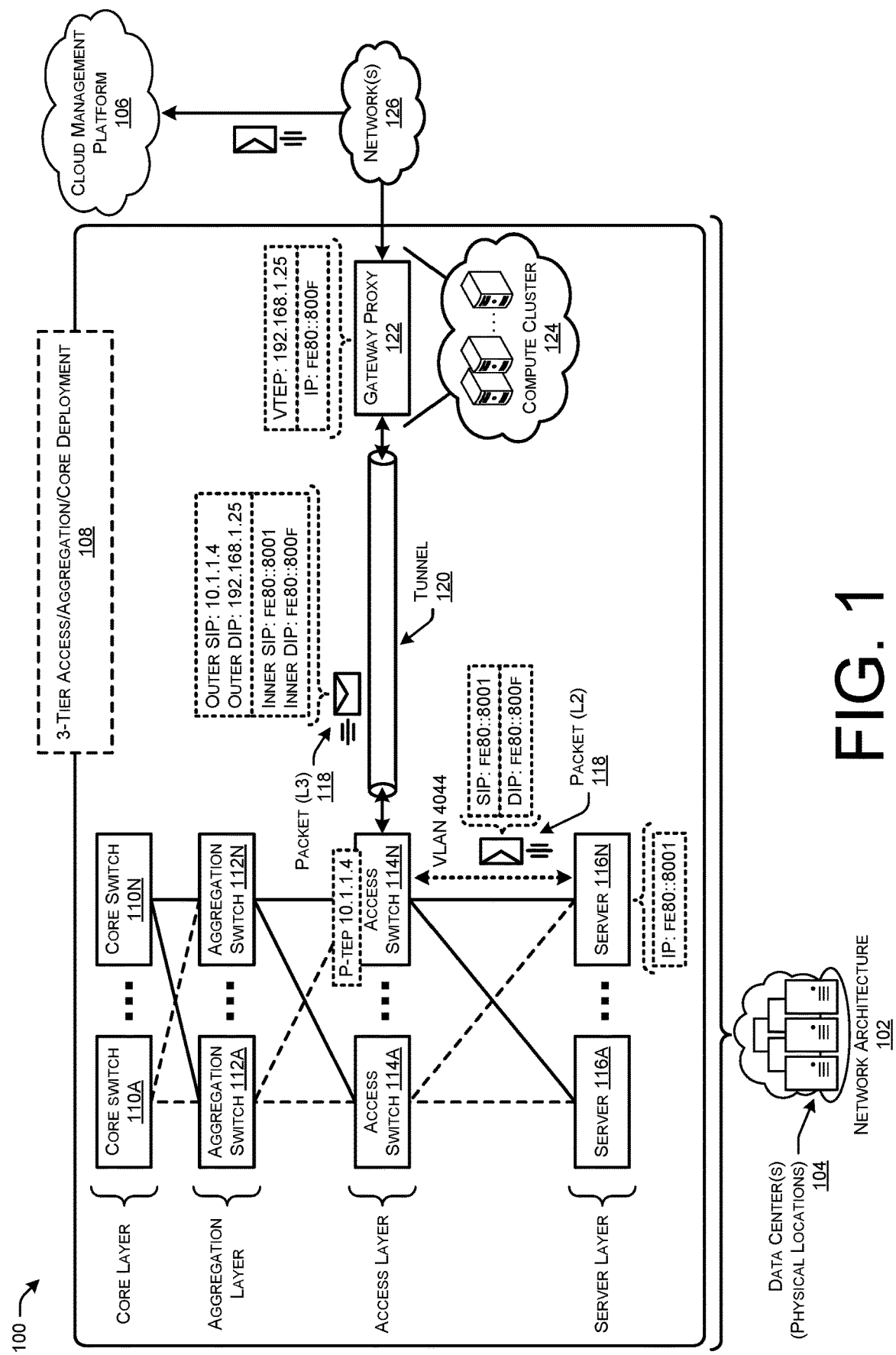
FIG. 1 illustrates a system-architecture diagram of an example data center fabric, specifically a 3-tier access/aggregation/core deployment, in which an endpoint device is provided management connectivity to a cloud management platform.

This disclosure describes techniques for providing connectivity between network devices in a data center fabric and a cloud management platform that performs techniques for managing the network devices.

The techniques may include a method including generating, at an endpoint device in a data center fabric, a first Internet Protocol version 6 (IPv6) Link-Local Address (LLA). The method may further include sending, from the endpoint device, a packet from over a Virtual Local Area Network (VLAN) to a switch to which the endpoint device is attached. In some examples, the packet is a Layer-2 (L2) packet and having a second IPv6 LLA associated with a gateway proxy as a destination address where the gateway proxy provides connectivity to a cloud management platform. The method may further include encapsulating, at the switch, the packet using an encapsulation protocol such that the packet is a L3 packet. In such examples, the packet has a Virtual Tunnel Endpoint (VTEP) address associated with the gateway proxy as an outer destination address. The method may further include sending, from the switch, the packet via a virtual tunnel to the VTEP address associated with the gateway proxy, and sending, from the gateway proxy, the packet to the cloud management platform over a network that is external the data center fabric.

Additionally, the techniques described in this disclosure may be performed as a method and/or by a system having non-transitory computer-readable media storing computer-executable instructions that, when executed by one or more processors, performs the techniques described above.

Example Embodiments

This disclosure describes techniques for combining the functionality of fabric interconnects and switches (e.g., Top-of-Rack (ToR) switches, access switches, leaf switches, etc.) into one network entity, thereby reducing the number of devices in a fabric and complexity of communications in the fabric. By collapsing FI and ToR switch functionality into one network entity, server traffic may be directly forwarded by the ToR switch and an entire tier is now eliminated from the topology hierarchy which may improve the control, data, and management plane. Further, this disclosure describes techniques for dynamically managing the number of gateway proxies running on one or more computer clusters based on a number of managed switch domains.

In some examples, the FI may be combined with a ToR switch, as noted above. However, in some instances the ToR and FI may be combined as a leaf switch in a typical leaf-spine VXLAN-EVPN fabric, an access-layer switch in a 3-tier access-aggregation-core topology, a layer-3 leaf switch in a Massively Scalable Data Center (MSDC) routed fabric, and so forth based on different fabric deployments. Thus, the techniques are usable, or support, any kind of network operating system for various switches (e.g., Ethernet switches).

Generally, management traffic that is communicated by agents running on the servers need to be forwarded to a portal associated with the cloud management platform. To do so, the agents need to be provisioned on the network devices (e.g., servers) with IP addresses, which can be done statically or via some dynamic means like Dynamic Host Configuration Protocol (DHCP). However, the number of agents that are provisioned with IP addresses in data centers can be relatively high (e.g., hundreds of devices, thousands of devices, etc.). In light of this high number of agents and/or devices that need IP addresses, the techniques described herein may utilize IPv6, and more specifically, stateless IPv6 address auto-configuration.

Accordingly, the agents running on the devices may generate or otherwise obtain an IPv6 LLA via auto-configuration, such as by using StateLess Address Auto Configuration (SLAAC). Using SLAAC, the agent running on each network device may send a router a request for the network prefix, and the agents/devices may use the prefix and their own MAC addresses to create an IPv6 address. While each agent does have an IPv6 link-local address, this restricts or eliminates routing. Thus, it may be possible to localize the bridge-domain or virtual Local Area Network (VLAN) or broadcast domain of all the servers below a pair of ToR switches. However, there remains an issue as to how to forward the traffic from the agents out to the cloud management platform as the traffic still needs to be routed out, typically via some Internet proxy. Further, it would be advantageous to have techniques where traffic that is forwarded from the agents and to the cloud managing platform can work for all kinds of network deployments and network operating systems.

This disclosure describes techniques for running one or more gateway proxies on a compute cluster that provides connectivity to a cloud management platform over one or more external networks, such as the Internet. Generally, the ToR switch (or leaf switch, aggregator switch, etc.) may receive unicast and/or multicast traffic via a VLAN from servers, and may steer that traffic to a static VXLAN tunnel (or other encapsulation tunnel) endpoint that is associated with the gateway proxies running on the compute cluster. The gateway proxies then behave as a proxy and communicate the traffic with the cloud management system. Further, the techniques include managing a stretched compute cluster across a multi-site deployment, and/or multiple compute clusters across a multi-site deployment, where the number of gateway proxies running on the cluster(s) is dynamically managed to minimize the impact of a gateway proxy failure for the various switch domains in the multi-site deployment.

As mentioned earlier, there are multiple types of network operating system deployments for data centers, such as the 3-tier Access-Aggregation-Core deployment, the routed-fabric deployment, the VXLAN-EVPN fabric deployment, and so forth. The techniques described here are usable for all those deployments, as well as other fabric deployments not described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example network architecture 102 (e.g., switched fabric), specifically a 3-tier access/aggregation/core deployment, in which an endpoint device is provided management connectivity to a cloud management platform.

Generally, the network architecture 102 may include devices that are housed or located in one or more data centers 104 that may be located at different physical locations. For instance, the network architecture 102 may be supported by networks of devices in a public cloud computing platform, a private/enterprise computing platform, a hybrid computing platform, and/or any combination thereof. The one or more data centers 104 may be physical facilities or buildings located across geographic areas that are designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the network architecture 102 may not be located in explicitly defined data centers 104 and, rather, may be located in other locations or buildings.

The network architecture 102 may include a domain of network devices located in one or more data centers 104, including various hardware devices and/or virtualized components. For instance, the network architecture 102 illustrated in FIG. 1 includes a 3-tier access/aggregation/core deployment 108 that includes a core layer with core switches 110A-110N, an aggregation layer with aggregation switches 112A-112N, an access layer with access switches 114A-114N, and a server layer with servers 116A-116N (where "N" is any integer). Generally, the servers 116 (e.g., rack servers, blade servers, etc.) are attached to the access switches 114, which are typically layer-2 (L2) access switches. The L2 access switches 114 are generally attached to aggregation/distribution switches 112 where the Layer-2/ Layer 3 (L3) barrier is demarcated.

The access switches 114 are where the collapsed FI functionality will be hosted, and the access switches 114 may work in conjunction with one or more gateway proxies 122 running on a compute cluster 124 in the network architecture 102. The compute cluster 124 may be a platform, such as a Kubernetes-based platform, for hosting various services and/or applications, including the gateway proxy 112. The compute cluster 126 may be managed by an orchestrator, scheduler, and/or other entity that manages the compute elements (e.g., containers, virtual machines, etc.). The gateway proxy 122 (which may be one or more proxies 122) may behave as a proxy and provide secure connectivity to the cloud management platform 106. The cloud management platform 106 may generally be a management system or platform that delivers visualization, optimization, and orchestration for applications and infrastructure of users' computing environments.

The access layer switches 114 and the compute cluster 124 have IP connectivity via the core switches 110, and any routing protocol, and/or static routes, may be utilized for establishing the IP reachability. In order to automate the onboarding process for the servers 116 with the cloud management platform 106, various operations or steps may occur.

Generally, when an agent running on a server 116 comes up, the agent will perform techniques for obtaining an IPv6 Link-Local address (IPv6 LLA) using auto-configuration (e.g., SLAAC). Typically, the LLA is derived from the server 116 NIC-MAC address. For instance, when a server 116 or host boots up, it may obtain an IPv6 LLA using a MAC identifier of the server 116 according to various techniques described in the Request for Comments (RFC) 4291 published by the Internet Engineering Task Force (ETF). The initial traffic for the server-agent bring-up may be exchanged over a reserved VLAN with the access switch 114, which is illustrated as VLAN 4044 in FIG. 1.

Further, the gateway proxy 122 may be spawned or come up on the compute cluster 124, which may be performed using Customer Resource Definitions (CRDs) of Kubernetes. The gateway proxy 122 may be associated with an IPv6 LLA (fe80::800f shown in FIG. 1) and associated IPv4 VTEP address (shown as 192.168.1.25 shown in FIG. 1). The access layer switches 114 may be programmed with an encapsulation tunnel profile, such as a VXLAN tunnel profile, so that any traffic coming in the server discovery VLAN (4044 in this example), will be steered toward the gateway proxy 122. To avoid any IPv6 configuration in this deployment to make it as non-intrusive as possible, this tunneling option allows for all traffic (unicast and multicast) to be VXLAN encapsulated and sent out toward the VTEP 192.168.1.25 associated with the gateway proxy 122.

The IPv6 LLA associated with the gateway proxy 122 may be configured on the access switches 114 statically so that it can be passed over to the server 116 agent via appropriate Link Layer Discovery Protocol (LLDP) Type-Length Values (TLVs). In this way, the server 116 agents are always aware of the destination address associated with the gateway proxy 122. In this way, the agents on the servers 116 will be able to establish secure connectivity to the portal of the cloud management platform 106, and thus they can be discovered by the platform 106, onboarded at the platform 106, and an appropriate server profile can be associated with the servers-agents 116 thereby allowing for touchless server 116 bring-up.

In a specific example, the server 116 may generate and transmit one or more packets 118, which are Layer-2 packets, that include a destination IP address of the gateway proxy that the server 116 learns or obtains via a discovery protocol (e.g., LLDP, Service Discovery Protocol (SDP), etc.). The access switch 114 may receive the L2 packet, and encapsulate the L2 packet using an encapsulation protocol (e.g., VXLAN encapsulation). The packet 118, once encapsulated, is a Layer-3 (L3) packet 118 that has an inner destination IP corresponding to the IPv6 LLA of the gateway proxy 122 (e.g., fe80::800f) and an outer destination IP address corresponding to the Virtual Tunnel Endpoint (VTEP) for an endpoint of the tunnel 120 (the gateway proxy 122). The packet L3 118 is then communicated via the tunnel 120 to the gateway proxy 122, which then behaves as a proxy to communicate the packets to and from the cloud management platform 106 over one or more networks 126.

In some instances, the access switches (and the other switches 112/110) in the compute cluster 124 may experience one or more node failures, but may not require configuration. Thus, the gateway proxy, which may have multiple instances running on the compute cluster 124, may be sticky such that it will carry various information such as MAC addresses, IPv6 LLA, IPv4 properties with it in case it needs to be respawned at another node within the cluster 124 to improve resiliency.

The techniques described herein provide the ability to steer incoming unicast/multicast traffic in a VLAN to a static VXLAN tunnel endpoint, thereby avoiding the need for data plane or control plane-based learning on the collapsed FI+ToR network device (e.g., access switch 114 in FIG. 1). Typically, VXLAN learning occurs via a flood-and-learn mechanism or via a controller/control-plane aided mechanism. The techniques described herein avoids and simplifies those options in terms of additional usage of various endpoint/VTEP related hardware resources. While VXLAN is used as an example overlay encapsulation, the functionality presented here is agnostic to the type of overlay being employed.

Figure 4:
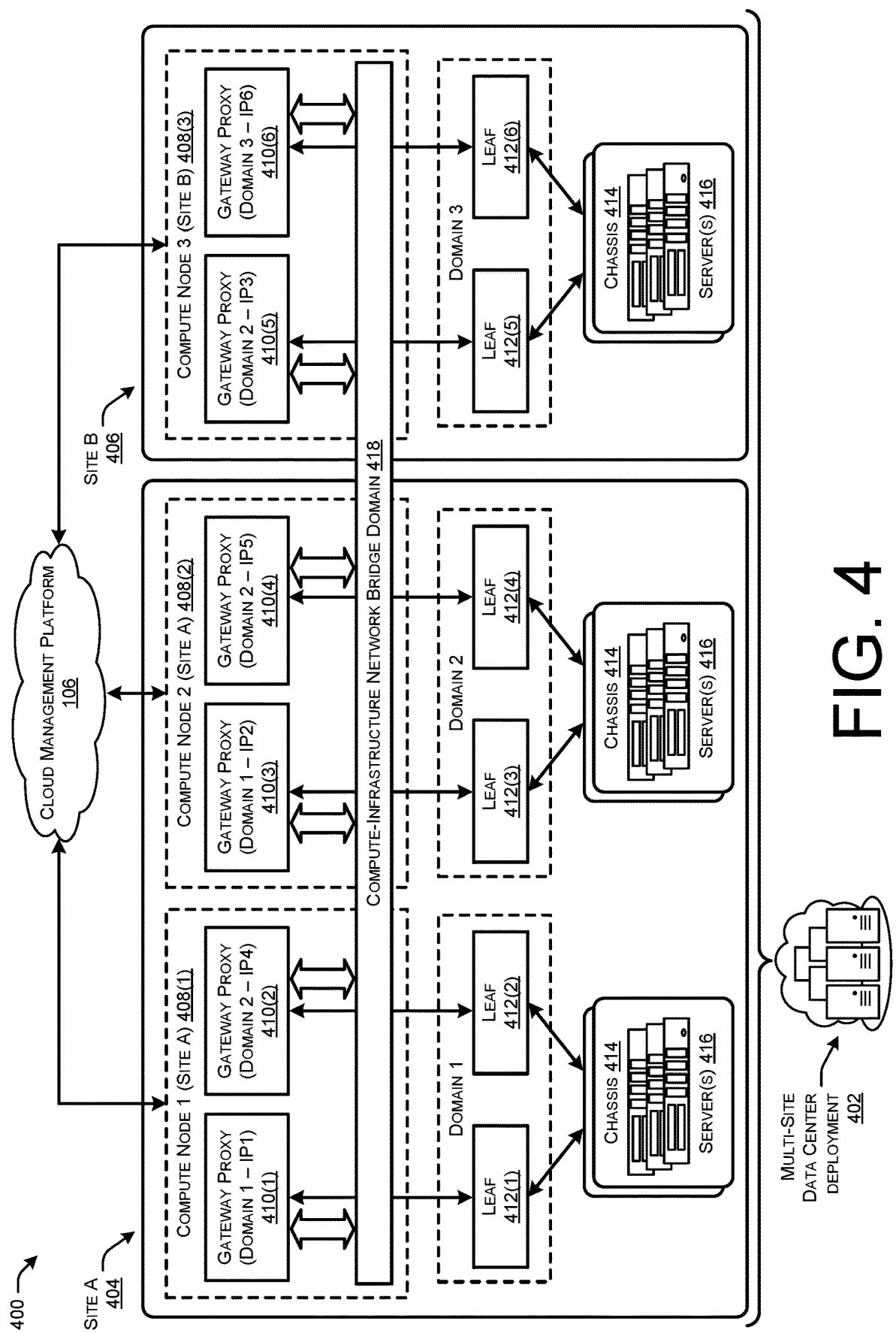
FIG. 4 illustrates a system-architecture diagram of an example multi-site, data center deployment that has a stretched compute cluster running gateway proxies for endpoints to be managed by a cloud management platform.
Figure 5:
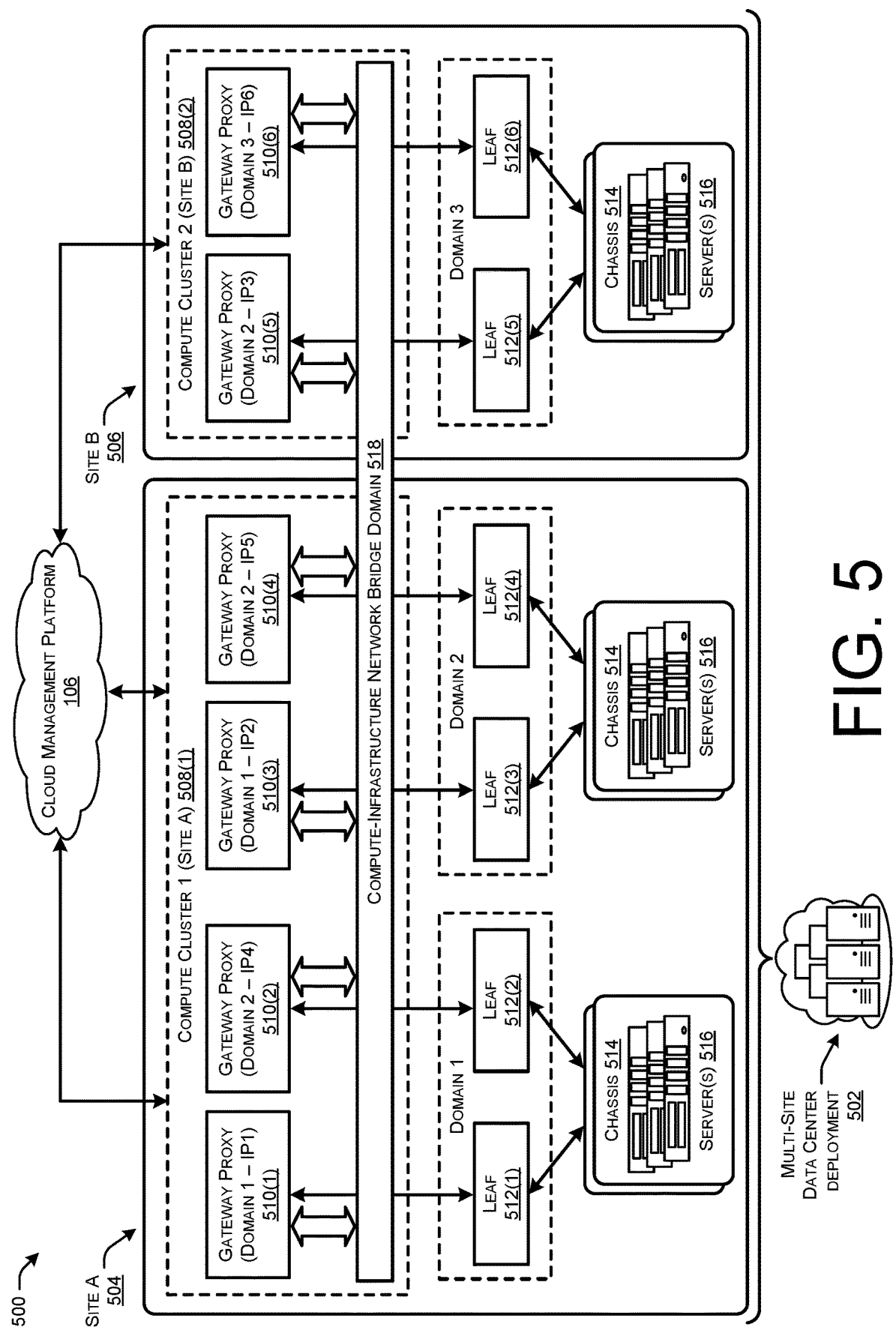
FIG. 5 illustrates a system-architecture diagram of an example multi-site, data center deployment that has multiple compute clusters running gateway proxies for endpoints to be managed by a cloud management platform.

As described further with reference to at least FIGS. 4 and 5, the techniques described herein further provide the ability to provide mobility of a container-based (e.g., Kubernetes) service/pod with its associated networking constructs, namely MAC address, IPv6 LLA, and VTEP address. That is, the gateway proxy 122 may have multiple instances that each run in a pod of the computer cluster 124. While the MAC and IPv6 LLA address is associated with an appropriate Virtual Ethernet (VETH) interface associated with the pod, the VTEP mobility will require appropriate plumbing of a VETH pair into the host network namespace. In case of layer-3 reachability of nodes in the cluster 124, some form of routing protocol such as Border Gateway Protocol (BGP)

may be used to dynamically advertise the VTEP address reachability from the right node where the service is currently hosted.

As noted above, the proposed mechanism can be similarly utilized for various types of network operating system deployments (e.g., 3-tier, Routed fabrics, VXLAN EVPN, VXLAN flood-n-learn etc.). The techniques described herein may avoid the need for global IPv6 address configuration within the existing network, which is advantageous for using these techniques in greenfield as well as brownfield environments.

Further, the techniques allow for management traffic to be forwarded to the portal of the cloud management platform 106 without involving an in-band path on the network switches. Internet connectivity is not required from all the network switches attached to the servers 116, but instead can be via central gateway proxy 122 that sits on the compute cluster 124.

The network(s) 126 include one or more networks implemented by any viable communication technology, such as wired and/or wireless modalities and/or technologies. The network(s) 126 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 126 may include devices, virtual resources, or other nodes that relay packets from one network segment to another by nodes in the computer network.

In some examples, the network architecture 102 may include various types of devices configured to communicate using various communication protocols (e.g., VPN, SSL, TLS, DTLS, and/or any other protocol) over the network(s) 126. For instance, the endpoints may comprise personal user devices (e.g., desktop computers, laptop computers, phones, tablets, wearable devices, entertainment devices such as televisions, etc.), network devices (e.g., servers, routers, switches, access points, etc.), and/or any other type of computing device.

Figure 2:
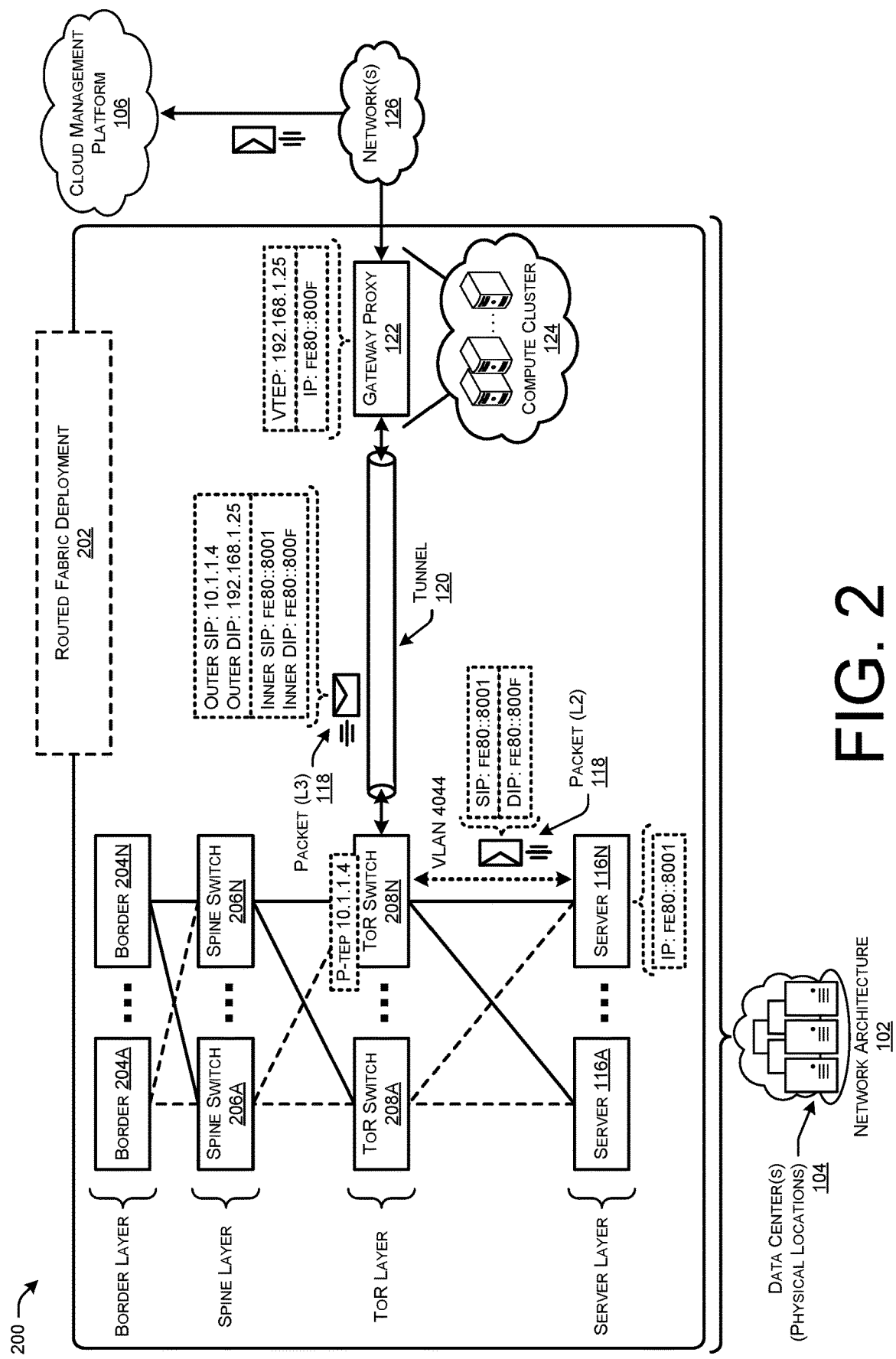
FIG. 2 illustrates a system-architecture diagram of another example data center fabric, specifically a routed fabric deployment, in which an endpoint device is provided management connectivity to a cloud management platform.

FIG. 2 illustrates a system-architecture diagram 200 of another example data center fabric, specifically a routed fabric deployment 202, in which an endpoint device is provided management connectivity to a cloud management platform.

FIG. 2 illustrates a sample flow for a Massively Scalable Data Center (MSDC) network fabric deployment. Similar to FIG. 1, VLAN 4044 is employed for management discovery traffic. ToR switch 208A and 208B may be a virtual Port-Channel (vPC) pair of switches to which a server 116 is dual-attached. The ToR switches 208 are where the Layer-2/Layer-3 boundary is present in routed fabrics, with an appropriate Hot Standby router Protocol/Virtual Router Redundancy Protocol (HSRP/VRRP) like first hop redundancy protocol (FHRP) protocol configured at that layer. There may be no subnet or layer-2 stretch across racks in such a deployment. Layer-3 reachability may be present between the ToR switches 208 and the compute cluster 124. From a management traffic handling point of view, the traffic from UCS server agent 116 will be forwarded to the gateway proxy 122 hosted on the compute cluster 124 in the same or similar way as was illustrated in FIG. 1 above.

Figure 3:
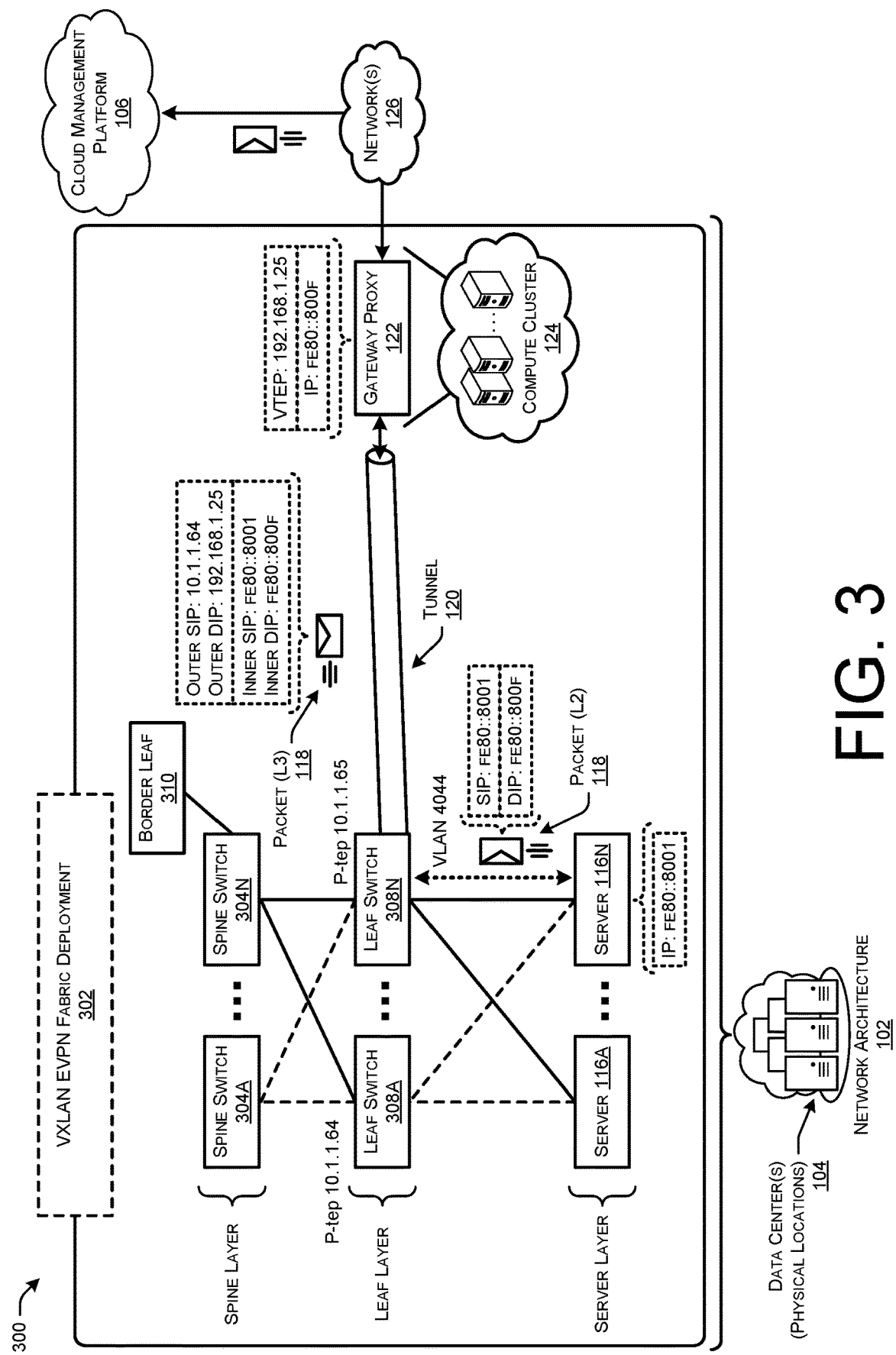
FIG. 3 illustrates a system-architecture diagram of another example data center fabric, specifically a Virtual Extensible LAN Ethernet Virtual Private Network (VXLAN-EVPN) fabric deployment, in which an endpoint device is provided management connectivity to a cloud management platform.

FIG. 3 illustrates a system-architecture diagram of another example data center fabric, specifically a Virtual Extensible LAN Ethernet Virtual Private Network (VXLAN-EVPN) fabric deployment 302, in which an endpoint device is provided management connectivity to a cloud management platform.

FIG. 3 illustrates how the techniques are applicable in a VXLAN EVPN deployment 302. As illustrated, the leaf layer of leaf switches 308A-308N is where the distributed IP anycast gateway is hosted along with all learning of endpoint/prefix to VTEP binding being advertised over BGP EVPN. Appropriate loopback interfaces are present on the leaf switches 308 that serve as the TEP for VXLAN encapsulation/decapsulation. The Physical IP (PIP) associated with these loopbacks can be re-used for the static VXLAN tunnel 120 that will forward all VLAN traffic (e.g., packet 118) toward the gateway proxy 122 hosted on the compute cluster 124. The PIPs are labelled as P-TEPs in the figure with 10.1.1.64 and 10.1.1.65 serving as the PTEP for leaf switch 308A and leaf switch 308N, respectively. Note that there is no additional requirement of allocating or configuring additional VTEPs in this deployment 302 for this purpose. The existing VTEPs in the VXLAN EVPN fabric can be leveraged for the techniques as described herein and that will have no effect on the existing VXLAN EVPN functionality or scale.

FIG. 4 illustrates a system-architecture diagram of an example multi-site, data center deployment that has a stretched compute cluster running gateway proxies for endpoints to be managed by a cloud management platform.

The multisite data center deployment 402 may utilize a fault-tolerant deployment for scaling management of servers 416 that span across multiple sites 404 and 406, and may deploy a single stretched computer cluster or multiple separate compute clusters. The secure connectivity from the server agents to the cloud management platform 106 is facilitated through a pair of proxy gateway proxy instances 410 hosted on compute nodes 408 of the stretched cluster, with one instance in the pair 41 having a site local affinity for headless management in case of loss of site-to-site connectivity.

The multi-site data center deployment 402 contains a large number of rows of server racks (e.g., chassis 414, server racks, etc.). In a data center, each rack may comprise a set of servers 416 and/or a set of server blades 416. The blade servers 416 in a blade-chassis 414 are in turn attached to leaf switches 412, and the leaf switches 412 are attached to gateway proxies 410. The gateway proxies 410, which serve as a stateless proxy for all server endpoints 416, may be deployed as a microservice/pod on the compute cluster. Since each server agent connects to the cloud management platform 106 via the gateway proxy 410, it becomes a single point of failure with a large radius. Any failure in the data center deployment 402, including the pod/service going down, compute node 408 going down, or even compute cluster going down, will affect all the connections going from all servers to the cloud management platform 106 and impact all the switch domains. Also, in some instances the same stretched compute cluster may support single and multiple site topologies, and in some instances each site may have its dedicated compute clusters. The techniques described herein provides scalability and high availability requirements for such gateway proxies 410 across various topologies.

As noted above, a container orchestrator may be used for the gateway proxy 410 that provides proxy connectivity to the cloud management platform 106, and the container orchestrator may be hosted as a microservice/pod. In data center deployments that span across multiple sites 404 and 406, it is possible to deploy a stretched compute cluster as long as latency and/or throughput requirements are met. In another example, for administrative, scale or geographical reasons, users may deploy separate compute clusters for every site/location. As a further example, there could be a hybrid combination where a stretched cluster may be deployed for some sites and for other sites, there could be separate compute clusters. For all these different deployment options, not only is it important to scale out the gateway proxies 410 so that they can satisfy the scale of the servers 416 that need to be managed below the managed switch domains, but there may be a desire for headless management if the compute cluster loses connectivity to the cloud management platform 106. For stretched compute clusters, in addition, another failure scenario that needs to be handled is loss of connectivity on the Data Center Interconnect which will result in a segregated set of compute nodes 408 at some sites.

Accordingly, proposed herein are techniques to dynamically manage the number of gateway proxies 410 on compute cluster(s) based on the number of managed switch domains in order to minimize impact radius of gateway proxy 410 failure. Using the container orchestration platform resiliency (e.g., Kubernetes), the services/pods on failed nodes 408 may be spawned on other existing compute nodes 408. As an example, suppose the following:

v: number of switch domains
   m: number of switch domains which are managed by the cloud management platform 106 (m<=v)
   n: number of gateway proxies providing connectivity to 'm' managed switch domains Where n<=m and n>=1.

In some instances, a radius factor can be used as a ratio between n and m where n=ceil(m/r). In various examples, an optimized desired radius factor can be determined based on scalability requirements. As new managed switch domains get added, new gateway proxies 410 can be instantiated based on some heuristic that depends on f(v, m, n).

In examples where a stretched compute cluster spans across multiple sites 404 and 406, to handle the scenario of connectivity failure between sites that can result in a partition of the compute cluster, there may be quorum on one site or the other. The site where the quorum is missing, it may still be useful to provide an option for headless management for troubleshooting purposes. For this purpose, whenever a new gateway proxy 410 has to be spawned, the gateway proxy 410 may be spawned as active-active pair on compute nodes 408 with a constraint that at least one gateway proxy instance 410 (site-local gateway proxy 410) is placed in the same site as the VPC Domain it supports. The other gateway proxy 410 (persistent gateway proxy 410) may be placed anywhere within the cluster subject to resource constraint satisfaction. Each gateway proxy 410 instance uses an IPv6 link-local address that will be the destination for the web-socket proxy of agents on the servers 416. As opposed to the persistent gateway proxy 410, the site local gateway proxy 410 instance needs to be up and running even in the absence of compute cluster quorum. Servers 416 connected to a particular switch domain are instructed to communicate to a specific gateway proxy 410 IPv6 LLA through an LLDP TLV advertisement. With compute node 408 failure, the persistent gateway proxy 410 will also go down if the compute node 408 hosting it goes down. But since this gateway proxy 410 is persistent, it will be brought up at any other compute node 408 within the cluster with the same sticky IPv6 LLA. With this approach, the effects of both gateway proxy 410 and compute node 408 failures are mitigated on chassis/server (endpoint) agent connectivity to the cloud management platform 106.

In this way, the pair of gateway proxies 410 provides web-socket proxy and headless management functionality for all servers 416 connected to switch domains under its management. Both gateway proxy 410 instances in the compute cluster are always active and hence proxy load is equally distributed. The gateway proxy 410 uses a distributed document store as its primary database, so users can access headless management from any site. In addition to distributed document store, the gateway proxy 410 will maintain local in-memory (potentially backed by local file system) headless management data cache for all servers 416 connected to the switch domains. The gateway proxy 410 can provide local headless management operations based on its local database/cache during network partition event, which can occur because of node failure or network connectivity issues.

The cloud management platform 106 will use one of the gateway proxy 410 instances running within the same site as primary gateway proxy 410 for all updates to headless management database. If there is no active gateway proxy 410 on-site, the cloud management platform 106 may block user operations that require headless management database updates. If a gateway proxy 410 loses connectivity to its peer, it will run in degraded state. When gateway proxy 410 instance is in degraded state, it may not allow any updates to headless management database, but it may support proxy and headless management for deployed servers 416.

FIG. 4 shows one deployment scenario, where a compute cluster is stretched across all sites 404 and 406. In this deployment, it is possible to lose connectivity between site A 404 and site b 406, and in such a scenario, compute node 3 408(3) will be network partitioned and it won't have access to distributed store. To prevent this, the Kubernetes CNI plugin will be enhanced and gateway proxy 410 will be deployed in such a way that gateway proxy 410 pod can continue to provide proxy functionality. Also, gateway proxy 410 on node 3 408(3) will able to provide headless management functionality based on the config data in the local cache. Switches in a VPC Domain are configured to connect to alternate proxy instance within a gateway proxy 410 pair, ensuring high availability even in single node failure situations.

FIG. 5 illustrates a system-architecture diagram of an example multi-site, data center deployment 502 that has multiple compute clusters running gateway proxies for endpoints to be managed by a cloud management platform 106.

As an alternative to deploying a stretched compute cluster, another option is to deploy multiple separate compute clusters 508(1) and 508(2), shown in FIG. 5. A difference in FIG. 5 as opposed to FIG. 4 is that separate compute clusters run independent container domains (E.g., Kubernetes domains) and the distributed data store is localized to the specific cluster. In this scenario, while the site local gateway proxy 410 instance will be localized to the site local compute cluster 508, the persistent gateway proxy 410 instance can be spawned on any node with any of the compute clusters. In essence, multiple compute clusters will be viewed as a single pooled resource with some sort of federation.

Accordingly, the techniques described herein provide the ability to run gateway proxy 410 (site-local gateway proxy 410) on a compute cluster ne even if that node is partitioned away from the cluster. A Kubernetes CNI plugin can be enhanced to support gateway proxy 410 functionality without requiring reset of server connections to the cloud management platform 106. Additionally, the techniques provide an ability to provide mobility of a service/pod with its associated networking constructs, namely, MAC address, IPv6 LLA, and VTEP address across nodes across multiple compute clusters. This functionality will be provided via custom CRDs and appropriate enhancements to the CNI plugin.

FIG. 6 illustrates a flow diagram of an example method that illustrate various aspects of the techniques of this disclosure. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a flow diagram of an example method 600 for providing an endpoint device (e.g., server 116) with connectivity to a cloud management platform 106. The method 600 may be usable for providing data-plane connectivity through a data center fabric to manage an endpoint device in the data center fabric.

At 602, an endpoint device may generate a first Internet Protocol version 6 (IPv6) Link-Local Address (LLA). For instance, an agent running on a server 116 may generate or otherwise obtain an IPv6 LLA via auto-congregation, such as by using StateLess Address Auto Configuration (SLAAC). Using SLAAC, the agent running on each network device may send a router a request for the network prefix, and the agents/servers 116 may use the prefix and their own MAC addresses to create the first IPv6 LLA address.

At 604, the endpoint device may send a packet from over a Virtual Local Area Network (VLAN) to a switch to which the endpoint device is attached. For instance, the server 116 may send a packet 118, which may be a Layer-2 (L2) packet 118. The packet 118 may have a second IPv6 LLA associated with a gateway proxy 122 as a destination address where the gateway proxy 122 provides connectivity to a cloud management platform 106.

At 606, a switch may encapsulate the packet using an encapsulation protocol such that the packet is a L3 packet. For instance, the access switch 114, ToR switch 208, and/or leaf switch 308 may encapsulate the L2 packet 118 with an encapsulation protocol (e.g., VXLAN) to result in a L3 packet 118. The L3 packet 118 may have a Virtual Tunnel Endpoint (VTEP) address associated with the gateway proxy 122 as an outer destination address.

At 608, the switch may send the packet 118 via a virtual tunnel to the VTEP address associated with the gateway proxy. For instance, the access switch 114, ToR switch 208, and/or leaf switch 308 may send the L3 packet 118 via a tunnel 120 (e.g., VXLAN tunnel) to the gateway proxy 122.

At 610, the gateway proxy 122 may send the packet 118 to the cloud management platform over a network that is external the data center fabric. For instance, the gateway proxy 122 may behave as an Internet proxy that communicates packets over the Internet, which may be part of the network(s) 126, to a cloud management platform.

FIG. 7 illustrates a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, VPNs, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 and or the resources 704 may each execute/host one or more tenant containers and/or virtual machines to perform techniques described herein.

In some instances, the data center 700 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like tenant containers and VM instances, data storage resources, networking resources, data communication resources, network services, VPN instances, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a device that can be utilized to implement the technologies disclosed herein will be described below with regard to FIG. 8.

Figure 8:
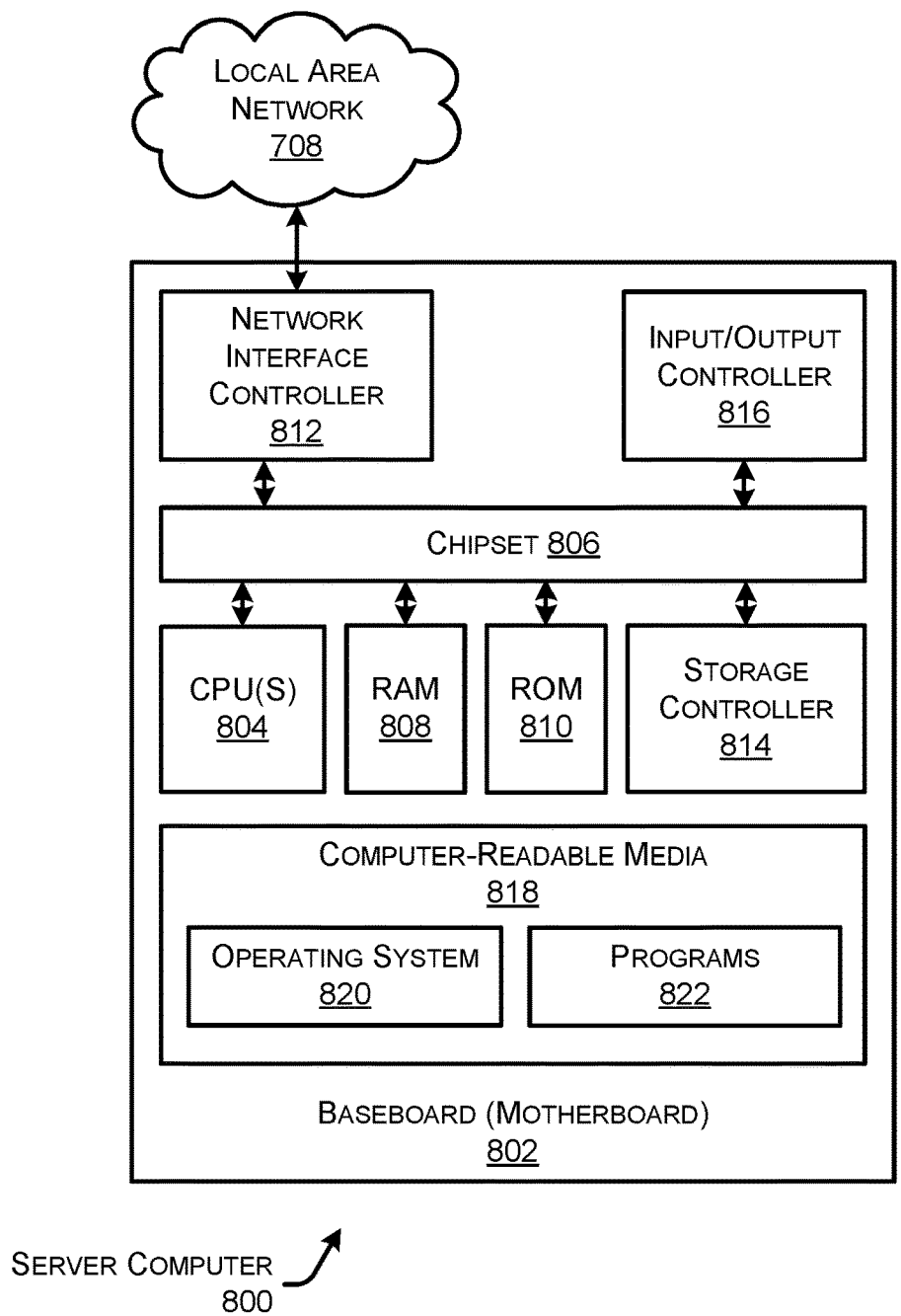
FIG. 8 illustrates a computer architecture diagram showing an example computer hardware architecture for implementing a computing device that can be utilized to implement aspects of the various technologies presented herein.

FIG. 8 illustrates a computer architecture diagram showing an example computer hardware architecture 800 for implementing a computing device that can be utilized to implement aspects of the various technologies presented herein. The computer hardware architecture 800 may be a conventional server computer, computing resource, network device (e.g., router, load balancer, data store, etc.), workstation, desktop computer, laptop, tablet, network appliance, e-reader, smartphone, or other computing device, and can be utilized to execute any of the software components presented herein. The computer 800 may, in some examples, correspond to at least one of a server 116, a blade server/component 116, a switch 114/208/308, and/or a system of computers 800 may make up the cloud management platform 106. The computer 800 may comprise networked devices such as servers, switches, routers, hubs, bridges, gateways, modems, repeaters, access points, etc.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 126. The chipset 806 can include functionality for providing network connectivity through a Network Interface Controller (NIC) 812, such as a gigabit Ethernet adapter. The NIC 812 is capable of connecting the computer 800 to other computing devices over the network 126. It should be appreciated that multiple NICs 812 can be present in the computer 800, connecting the computer to other types of networks and remote computer systems. In some examples, the NIC 812 may be configured to perform at least some of the techniques described herein, such as packet redirects and/or other techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device

818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by any components or devices described, may be supported by one or more devices similar to computer 800. Stated otherwise, some or all of the operations performed by the any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-6. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of a server 116, a switch (any described herein), or a system of devices that make up the cloud management platform 106 or a network device (e.g., server computer, computing resource, etc.). The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices, such as the communications described herein as being performed by the client devices 106 and computing resources 114 The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for providing data-plane connectivity through a data center to manage a server in the data center, the method comprising:
   determining, by an agent running on the server, to perform a management operation, wherein performance of the management operation includes communicating with a gateway proxy in the data center that provides connectivity to a cloud management platform;
   generating, at the server, a first Internet Protocol version 6 (IPv6) Link-Local Address (LLA);
   assigning a second IPV6 LLA to the gateway proxy associated with the data center;
   assigning a Virtual Tunnel Endpoint (VTEP) address to the gateway proxy;
   receiving, at the server, the second IPV6 LLA that is associated with the gateway proxy;
   populating, by the server, a Layer 2 (L2) packet with the first IPV6 LLA as a first source IP address and the second IPV6 LLA as a first destination IP address, wherein the L2 packet includes information associated with performance of the management operation;
   sending, from the server, the L2 packet over a Virtual Local Area Network (VLAN) to a switch in the data center to which the server is attached;

encapsulating, at the switch, the first packet using an encapsulation protocol to generate [an L3] a Layer-3 (L3) packet, the L3 packet having the VTEP address associated with the gateway proxy as a second destination address;

sending, from the switch, the L3 packet via a virtual tunnel within the data center to the VTEP address associated with the gateway proxy located in the data center;

decapsulating, at the gateway proxy, the L3 packet to result in the L2 packet; and sending, from the gateway proxy, the information included in the L2 packet to the cloud management platform over a network that is external to the data center.

2. The method of claim 1, wherein:
the gateway proxy is included in a pod of a compute cluster managed using an orchestration system;
the second IPV6 LLA is associated with the pod; and
the VTEP address is associated with the pod.

3. The method of claim 1, further comprising:
configuring the second IPV6 LLA assigned to the gateway proxy on the switch; and
sending, from the switch, a discovery protocol packet including an indication of the second IPV6 LLA to the server.

4. The method of claim 1, wherein the gateway proxy is included in an instance of gateway proxies running on a stretched compute cluster managed using an orchestration system, the stretched compute cluster spanning across multiple sites, further comprising:
determining a number of switching domains in the multiple sites;
determining a number of the gateway proxies based on the number of switching domains; and
instantiating the number of the gateway proxies on the stretched compute cluster.

5. The method of claim 1, wherein:
the data center is an L2/L3 fabric that is deployed according to a 3-tier access/aggregation/core deployment;
the switch is an access layer switch; and
the server is connected to the access layer switch.

6. The method of claim 1, wherein:
the data center is an L2/L3 fabric that is deployed according to a routed fabric deployment;
the switch is a Top-of-rack (ToR) switch; and
the server is connected to the ToR switch.

7. The method of claim 1, wherein:
the data center is an L2/L3 fabric that is deployed according to a Virtual Extensible LAN Ethernet Virtual Private Network (VXLAN-EVPN) fabric deployment;
the switch is a leaf switch;
the server is connected to the leaf switch; and
the L3 packet is sent to the VTEP address associated with the gateway proxy via a spine switch of the VXLAN-EVPN fabric deployment.

8. A system comprising:
one or more processors; and
one or more non-transitory computer-readable media storing instructions that, when executed by the one or more processors, cause the one or more processors to perform operations comprising:
determining, by an agent running on an endpoint device, to perform a management operation, wherein performance of the management operation includes communicating with a gateway proxy in the data center that provides connectivity to a cloud management platform;

assigning a first Internet Protocol version 6 (IPv6) Link-Local Address (LLA) to the endpoint device in the data center;
assigning a second IPV6 LLA to the gateway proxy associated with the data center;
assigning a Virtual Tunnel Endpoint (VTEP) address to the gateway proxy;
receiving, at the endpoint device, the second IPV6 LLA that is associated with the gateway proxy;
populating, by the endpoint device, a Layer 2 (L2) packet with the first IPV6 LLA as a first source IP address and the second IPv6 LLA as a first destination IP address, wherein the L2 packet includes information associated with performance of the management operation;
sending, from the endpoint device, the L2 packet over a Virtual Local Area Network (VLAN) to a switch in the data center to which the endpoint device is attached;
encapsulating, at the switch, the first packet using an encapsulation protocol to generate a Layer-3 (L3) packet, the L3 packet having the VTEP address associated with the gateway proxy as a second destination address;
sending, from the switch, the L3 packet via a virtual tunnel in the data center to the VTEP address associated with the gateway proxy located in the data center;
decapsulating, at the gateway proxy, the L3 packet to result in the L2 packet; and
sending, from the gateway proxy, the information included in the L2 packet to the cloud management platform over a network that is external to the data center.

9. The system of claim 8, wherein:
the gateway proxy is included in a pod of a compute cluster managed using an orchestration system;
the second IPv6 LLA is associated with the pod; and
the VTEP address is associated with the pod.

10. The system of claim 8, the operations further comprising:
configuring the second IPV6 LLA associated with the gateway proxy on the switch; and
sending, from the switch, a discovery protocol packet including an indication of the second IPV6 LLA to the endpoint device.

11. The system of claim 8, wherein the gateway proxy is included in an instance of gateway proxies running on a stretched compute cluster managed using an orchestration system, the stretched compute cluster spanning across multiple sites, the operations further comprising:
determining a number of switching domains in the multiple sites;
determining a number of the gateway proxies based on the number of switching domains; and
instantiating the number of the gateway proxies on the stretched compute cluster.

12. The system of claim 8, wherein:
the data center is an L2/L3 fabric that is deployed according to a 3-tier access/aggregation/core deployment;
the switch is an access layer switch; and
the endpoint device is a server or a blade server that is connected to the access layer switch.

13. The system of claim 8, wherein:
the data center is an L2/L3 fabric that is deployed according to a routed fabric deployment;
the switch is a Top-of-rack (ToR) switch; and
the endpoint device is a server or a blade server that is connected to the ToR switch.

14. The system of claim 8, wherein:
the data center is an L2/L3 fabric that is deployed according to a Virtual Extensible LAN Ethernet Virtual Private Network (VXLAN-EVPN) fabric deployment;
the switch is a leaf switch;
the endpoint device is a server or a blade server that is connected to the leaf switch; and
the L3 packet is sent to the VTEP address associated with the gateway proxy via a spine switch of the VXLAN-EVPN fabric deployment.

15. One or more non-transitory computer-readable media storing instructions that, when executed by one or more processors, cause the one or more processors to perform operations comprising:
determining, by an agent running on an endpoint device, to perform a management operation, wherein performance of the management operation includes communicating with a gateway proxy in the data center that provides connectivity to a cloud management platform;
assigning a first Internet Protocol version 6 (IPv6) Link-Local Address (LLA) to the endpoint device in the data center;
assigning a second IPV6 LLA to the gateway proxy associated with the data center;
assigning a Virtual Tunnel Endpoint (VTEP) address to the gateway proxy;
receiving, at the endpoint device, the second IPV6 LLA that is associated with the gateway proxy;
populating, by the endpoint device, a Layer 2 (L2) packet with the first IPV6 LLA as a first source IP address and the second IPV6 LLA as a first destination IP address, wherein the L2 packet includes information associated with performance of the management operation;
sending, from the endpoint device, the L2 packet over a Virtual Local Area Network (VLAN) to a switch in the data center to which the endpoint device is attached;
encapsulating, at the switch, the first packet using an encapsulation protocol to generate a Layer-3 (L3) packet, the L3 packet having the VTEP address associated with the gateway proxy as a second destination address;
sending, from the switch, the L3 packet via a virtual tunnel in the data center to the VTEP address associated with the gateway proxy located in the data center;
decapsulating, at the gateway proxy, the L3 packet to result in the L2 packet; and
sending, from the gateway proxy, the information included in the L2 packet to the cloud management platform over a network that is external to the data center.

16. The one or more non-transitory computer-readable media of claim 15, wherein:
the gateway proxy is included in a pod of a compute cluster managed using an orchestration system;
the second IPV6 LLA is associated with the pod; and
the VTEP address is associated with the pod.

17. The one or more non-transitory computer-readable media of claim 15, the operations further comprising:
configuring the second IPV6 LLA associated with the gateway proxy on the switch; and
sending, from the switch, a discovery protocol packet including an indication of the second IPV6 LLA to the endpoint device.

18. The one or more non-transitory computer-readable media of claim 15, wherein the gateway proxy is included in an instance of gateway proxies running on a stretched compute cluster managed using an orchestration system, the stretched compute cluster spanning across multiple sites, the operations further comprising:
determining a number of switching domains in the multiple sites;
determining a number of the gateway proxies based on the number of switching domains; and
instantiating the number of the gateway proxies on the stretched compute cluster.

19. The one or more non-transitory computer-readable media of claim 15, wherein:
the data center is an L2/L3 fabric that is deployed according to a 3-tier access/aggregation/core deployment;
the switch is an access layer switch; and
the endpoint device is a server or a blade server that is connected to the access layer switch.

20. The one or more non-transitory computer-readable media of claim 15, wherein:
the data center is an L2/L3 fabric that is deployed according to a routed fabric deployment;
the switch is a Top-of-rack (ToR) switch; and
the endpoint device is a server or a blade server that is connected to the TOR switch.

* * * * *